United States Patent Office 2,836,573
Patented May 27, 1958

2,836,573

MARKING INKS CONTAINING GLYCIDYL POLY-ETHERS, ROSIN, AND ALUMINUM NITRATE

Kenneth L. Rohrer, Elmira, N. Y., assignor to Westinghouse Electric Corporation, East Pittsburgh, Pa., a corporation of Pennsylvania No Drawing. Application October 31, 1956
Serial No. 619,413

2 Claims. (Cl. 260—24)

This invention relates to marking inks, and particularly to inks suitable for use in marking ceramic materials and the like.

It is desirable to have available for marking glass, ceramics, plastics and the like an ink that, after application, will have good adherence to the surface to which it is applied, will not smudge and will be free from tack. It is also important that the ink, after application, be resistant to abrasion and not rub off during handling, and yet can be easily removed by a suitable solvent to permit remarking of the surface if desired. Another important and desirable feature is that the ink not emulsify or gel in the printing machine.

The object of this invention is to provide an ink suitable for marking glass, ceramics, plastics, and metal, comprising a pigment dispersed in a vehicle, said vehicle comprising a solution of an epoxide resin and aluminum nitrate in a volatile solvent.

Another object of this invention is to provide an ink suitable for marking glass, ceramics, plastics, and metal, comprising a pigment dispersed in a vehicle, said vehicle comprising a solution of an epoxide resin, aluminum nitrate and rosin in a solvent.

Other objects of this invention will, in part, be obvious and will, in part, appear hereinafter. For a better understanding of the nature and objects of the invention, reference should be had to the following detailed description.

By the present invention there are provided marking inks which possess excellent workability on printing machines or hand stamps and which inks form extremely hard, durable and adherent films on glass, ceramics, plastics, metals and the like.

The marking inks of the present invention comprise a coloring pigment dispersed in a vehicle which comprises a liquid solution of an epoxide resin and aluminum nitrate in a volatile solvent. The epoxide resin functions as the pigment binder material. The aluminum nitrate imparts excellent drying properties, and durability characteristics to the inks. The volatile solvent constitutes a liquid carrier medium for the other components of the ink. These inks, when applied to a glass surface and heated to about 135° C. and higher, produce an adherent marking that possesses excellent heat stability and good resistance to abrasion. In order to improve the air-drying characteristics of the inks, a small amount of rosin may be added.

As the pigment or coloring material for the marking inks of this invention, there may be employed any of the well known finely divided insoluble inorganic or organic materials such as, for example, ultramarine blue, milori blue, chrome yellow, phthalocyanine green, cadmium yellow, cadmium red and carbon black. To obtain a white marking ink, titanium dioxide may be employed as the pigment coloring material.

The epoxide resins, also known as glycidyl polyethers, employed as the pigment binder material of this invention may be prepared by reacting predetermined amounts of at least one polyhydric phenol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4'-dihydroxy-diphenyl-dimethylmethane (referred to hereinafter as bisphenol "A") and 4,4'-dihydroxy-diphenyl-methane. In admixture with the named polynuclear phenols, use also may be made of those polynuclear phenols wherein the phenol nuclei are joined by sulfur bridges such, for example, as 4,4'-dihydroxy-diphenyl-sulfone.

While it is preferred to use epichlorohydrin as the epihalohydrin in the preparation of the resinous polymeric epoxide starting materials of the present invention, homologues thereof, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The resinous polymeric epoxide suitable for use in this invention has a 1,2-epoxy equivalency greater than 1.0. By epoxy equivalency reference is made to the number of 1,2-epoxy groups contained in the average molecule of the glycidyl ether.

Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers thus is a value between 1.0 and 2.0. In other cases the epoxide equivalency is given in terms of epoxide equivalents in 100 grams of the resin, and this may vary from about 0.08 to 0.70. Also, epoxide equivalent is often expressed as the number of grams of resin containing one equivalent of epoxide.

Resinous polymeric epoxides or glycidyl polyethers suitable for use in accordance with this invention may be prepared by admixing and reacting from one mole to two moles proportions of epihalohydrin, preferably epichlorohydrin, with about one mole proportion of bisphenol "A" in the presence of at least a stoichiometric excess of alkali based on the amount of halogen.

To prepare the resinous polymeric epoxides, aqueous alkali, bisphenol "A" and epichlorohydrin are introduced into and admixed in a reaction vessel. The aqueous alkali serves to dissolve the bisphenol "A" with the formation of the alkali salts thereof. If desired, the aqueous alkali and bisphenol "A" may be admixed first and then the epichlorohydrin added thereto, or an aqueous solution of alkali and bisphenol "A" may be added to the epichlorohydrin. In any case, the mixture is heated in the vessel to a temperature within the range of about 80° C. to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali. The resulting epoxy resins may be liquid or solid at room temperature.

Various epoxy resins have given good results. Thus, the following have been used with success.

Example I

An epoxide resin having a melting point of 97–103° C., and an epoxide equivalency of 0.11 to 0.12 per 100 grams of resin, and a 40% solution in butyl Carbitol has a viscosity of R–T on the Gardner-Holdt scale. This resin is available commercially as Epon 1004.

Example II

An epoxide resin having a melting point of 64–67° C., an epoxide equivalency of from 0.19 to 0.20 per 100 grams of resin and a 40% solution in butyl Carbitol has a viscosity of C–G on the Gardner-Holdt scale. This epoxy resin is commercially available as Epon 1001.

The volatile organic solvent employed as the liquid carrier medium for the inks is one that possesses high solvency for epoxide resins and has a relatively high boiling point of over 100° C. so that it has a low evaporation rate at room temperature. Examples of particularly suitable solvents are methyl Cellosolve, ethyl Cellosolve, butyl Cellosolve, ethyl Carbitol and butyl Carbitol, which are proprietary designations for ethylene glycol monomethyl ether, ethylene glycol monoethyl ether, ethylene glycol monobutyl ether, diethylene glycol monoethyl ether, and diethylene glycol monobutylether; respectively. However, other volatile organic solvents, including mixtures of two or more solvents, can be employed.

To impart better air-drying characteristics to the printing inks of this invention a small amount of rosin may be incorporated into the vehicle. Rosin is known to be a mixture of various isomeric resin acids, all having the empirical formula $C_{19}H_{29}COOH$, and containing two double bonds per molecule. The literature is replete with references to the different isomeric resin acids. The best known of these acids are d-abietic acid, l-abietic acid, d-pimaric acid, l-pimaric acid, sapinic acid, and sylvic acid. The relative proportions in which these and other isomeric resin acids exist in a given rosin depends on the source. Thus, wood rosins contain about 10% to 12% d-pimaric acid, together with about 25% to 40% abietic acid. French gum rosin is reported to be composed of about 11% d-pimaric acid, about 22% l-pimaric acid, and about 67% sapinic acid; and American gum rosin is said to be of quite similar composition. The printing inks modified by the addition of rosin may be dried by the application of heat if desired.

In preparing the inks of this invention, the vehicle is prepared and the pigment then added to the vehicle. The resulting mixture is ball milled for maximum pigment dispersion. It has been found that a range of proportions of the ingredients may be employed in preparing the ink. The preferred workable range has been found to be from 15 to 50% by weight of pigment and from 85% to 50% by weight of the vehicle, where the vehicle contains no rosin. When rosin is employed in the vehicle to provide better air-drying properties to the ink the range is from 15% to 40% by weight of pigment and from 85% to 60% by weight of the vehicle. Rosin increases the viscosity of the vehicle; hence it is necessary to reduce the amount of the pigment employed to maintain the viscosity of the ink in a workable range.

In the preparation of the vehicle, the amount of solvent employed may vary from 40 to 70 parts by weight and the balance, from 60 to 30 parts by weight, the total being 100 parts, comprises epoxide resin and aluminum nitrate, the epoxide resin being present in an amount of from 1 to 2 parts by weight for each part by weight of the aluminum nitrate. If rosin is incorporated in the vehicle, it is employed in an amount of from 0.5 to 1 part by weight for each part by weight of the aluminum nitrate.

The following examples are illustrative of the compositions of the vehicle that may be employed in this invention.

Example III

| | Parts by weight |
|---|---|
| Epoxide resin of Example II | 16.7 |
| Aluminum nitrate | 16.7 |
| Butyl Cellosolve | 66.6 |

Example IV

| | |
|---|---|
| Epoxide resin of Example II | 40.0 |
| Aluminum nitrate | 20.0 |
| Butyl Cellosolve | 40.0 |

Example V

| | |
|---|---|
| Epoxide resin of Example I | 20.0 |
| Aluminum nitrate | 20.0 |
| Ethyl Cellosolve | 60.0 |

The following examples illustrate compositions embodying rosin that may be employed as vehicles in this invention.

Example VI

| | Parts by weight |
|---|---|
| Epoxide resin of Example II | 22.2 |
| Aluminum nitrate | 22.2 |
| Rosin | 11.1 |
| Butyl Cellosolve | 44.5 |

Example VII

| | |
|---|---|
| Epoxide resin of Example I | 15.4 |
| Aluminum nitrate | 15.4 |
| Rosin | 7.7 |
| Ethyl Cellosolve | 61.5 |

Example VIII

| | |
|---|---|
| Epoxide resin of Example II | 22.2 |
| Aluminum nitrate | 11.1 |
| Rosin | 11.1 |
| Butyl Cellosolve | 55.6 |

The following example illustrates the preparation of the ink of this invention without rosin modification. All parts are by weight.

Example IX

Seventeen parts of the epoxide resin of Example II were dissolved in 30 parts of butyl Cellosolve. To hasten the solvency action of the butyl Cellosolve the mixture was heated to a temperature of about 70° C. and stirred with a mechanical stirrer for about 10 minutes. Seventeen parts of aluminum nitrate were dissolved in 20 parts of butyl Cellosolve, the mixture being heated to about 40° C. and stirred with a mechanical stirrer for about 10 minutes. The aluminum nitrate solution was then added to the epoxide resin solution and stirred to insure thorough mixing, 5 minutes of stirring with a mechanical stirrer being sufficient. Sixteen parts by weight of finely divided chrome yellow were added to the epoxide resin and aluminum nitrate vehicle solution. This mixture was then ball milled for about 4 hours to provide for good dispersion of the chrome yellow. The ink of Example IX was used to mark a glass tube by application with a stamp. Immediately after marking, the surface to which the ink marking was applied was heated to about 134° C. for a few seconds to dry the ink. The marking had good heat resistance, was extremely durable, and had good resistance to abrasion.

The following example illustrates the preparation of an ink of this invention in which the vehicle is modified by the addition of rosin. All parts are by weight.

Example X

A solution of 18 parts of epoxide resin of Example II and 25 parts of butyl Cellosolve was prepared in the same manner as set forth in Example IX. Nine parts of melted rosin were added to the solution and the mixture was heated to a temperature of 70° C. and stirred with a mechanical stirrer for about 10 minutes. To this mixture was added a solution of 18 parts of aluminum nitrate dissolved in 12 parts of butyl Cellosolve and the resulting mixture was stirred for about 10 minutes. Eighteen parts of finely divided chrome yellow were added to the above vehicle and the resulting composition was ball milled for 4 hours to provide good dispersion of the pigment in the vehicle.

A glass tube was marked with the ink of Example X and allowed to air-dry. After a few seconds the marking when touched by a finger showed no tackiness and did not smudge. After several hours of air-drying there resulted a marking that had good heat resistance and good resistance to abrasion. However, the marking was readily removed by rubbing with a cloth soaked with acetone.

At the same time as the pigment is added to the vehicle to produce the printing ink of this invention, a very small amount, of the order of 0.10 to 0.20 gram per 100 grams of ink, of a wetting agent may be added to more effectively wet the pigment particles for better dispersion. Examples of suitable wetting agents are: dioctyl sodium sulfosuccinate, dihexyl sodium sulfosuccinate, and isopropyl naphthalene sodium sulfonate.

The marking inks of this invention can be applied to glass, ceramics, plastics, metals and like materials by any conventional means such as printing machines and hand stamps. The inks possess good workability and do not emulsify or gel. After application, the ink may be dried by the application of infrared heat, radiant heat, open flame or any other convenient method. The resulting marking has good adherence to the surface to which it is applied, has good resistance to heat and has good resistance to abrasion.

Since certain obvious changes may be made in the above procedures and different embodiments of the invention may be made without departing from the scope thereof, it is intended that all matter contained in the above description shall be interpreted as illustrative and not in a limiting sense.

I claim as my invention:

1. A printing ink comprising from 15% to 50% by weight of a finely divided insoluble pigment dispersed in from 85% to 50% by weight of a vehicle, said vehicle comprising a solution of a glycidyl polyether derived from a dihydric phenol and an epihalohydrin and aluminum nitrate in a volatile organic solvent, said solvent comprising from 40% to 70% by weight of the vehicle, and the glycidyl polyether and the aluminum nitrate comprising from 60% to 30% by weight of the vehicle, said glycidyl polyether comprising from 1 to 2 parts by weight for each part by weight of the aluminum nitrate.

2. A printing ink comprising from 15% to 40% by weight of a finely divided insoluble pigment dispersed in from 85% to 60% by weight of a vehicle, said vehicle comprising a solution of a glycidyl polyether derived from a dihydric phenol and an epihalohydrin, aluminum nitrate and rosin in a volatile organic solvent, said solvent comprising from 40% to 70% by weight of the vehicle, and the glycidyl polyether, the aluminum nitrate and the rosin comprising from 60% to 30% by weight of the vehicle, said glycidyl polyether comprising from 1 to 2 parts by weight for each part by weight of the aluminum nitrate, and the aluminum nitrate comprising from 1 to 2 parts by weight for each part by weight of the rosin.

No references cited.